United States Patent
Inose et al.

(10) Patent No.: US 10,495,241 B2
(45) Date of Patent: Dec. 3, 2019

(54) THREADED JOINT FOR STEEL PIPE

(71) Applicants: Nippon Steel & Sumitomo Metal Corporation, Tokyo (JP); Vallourec Oil and Gas France, Aulnoye-Aymeries (FR)

(72) Inventors: Keita Inose, Tokyo (JP); Masaaki Sugino, Tokyo (JP); Sadao Douchi, Tokyo (JP)

(73) Assignees: Nippon Steel Corporation, Tokyo (JP); Vallourec Oil and Gas France, Aulnoye-Aymeries (FR)

(*) Notice: Subject to any disclaimer, the term of this patent is extended or adjusted under 35 U.S.C. 154(b) by 55 days.

(21) Appl. No.: 16/060,770

(22) PCT Filed: Nov. 2, 2016

(86) PCT No.: PCT/JP2016/082567
§ 371 (c)(1),
(2) Date: Jun. 8, 2018

(87) PCT Pub. No.: WO2017/104282
PCT Pub. Date: Jun. 22, 2017

(65) Prior Publication Data
US 2018/0363813 A1 Dec. 20, 2018

(30) Foreign Application Priority Data
Dec. 15, 2015 (JP) .................. 2015-244620

(51) Int. Cl.
F16L 15/00 (2006.01)
F16L 15/04 (2006.01)
F16L 15/06 (2006.01)

(52) U.S. Cl.
CPC ............. *F16L 15/002* (2013.01); *F16L 15/04* (2013.01); *F16L 15/06* (2013.01)

(58) Field of Classification Search
CPC ..... F16L 15/001; F16L 15/002; F16L 15/007; E21B 17/042; E21B 17/043
(Continued)

(56) References Cited

U.S. PATENT DOCUMENTS 4,009,893 A * 3/1977 Schatton ............... E21B 17/042
285/334
4,085,951 A * 4/1978 Morris .................. F16L 15/007
285/334

(Continued)

*Primary Examiner* — David Bochna
(74) *Attorney, Agent, or Firm* — Banner & Witcoff, Ltd.

(57) ABSTRACT

A threaded joint for steel pipe is provided that ensures good sealing performance and reduces crevice corrosion. A threaded joint includes a pin (10) and a box (20). The pin (10) includes a first shoulder surface (11), a first male thread (14), a second shoulder surface (18), and a second male thread (17). The box (20) includes a first shoulder surface (21), a first female thread (24), a second shoulder surface (28), and a second female thread (27). Supposing that the distance between the shoulder surfaces of the pin (10) is represented as $L_{pin}$ and the distance between the shoulder surfaces of the box (20) is represented as $L_{box}$, and the interference $\delta_{shld}$ is defined by Equation (1) given below, then, the threaded joint is constructed such that Equations (2) and (3) given below are satisfied. In Equations (2) and (3), P is the thread pitch of the first male thread (14), $\Delta_{min}$ and $\Delta_{max}$ are the lower and upper limits, respectively, for the difference between the numbers of tightening rotations, and λ is the elongation of the portion of the pin (10) located closer to the tip than the second shoulder surface (18) is.

[Formula 1]

$$\delta_{shld} = L_{box} - L_{pin} \qquad (1)$$

$$P \times \Delta_{min} + \lambda \leq \delta_{shld} \leq P \times \Delta_{max} + \lambda \qquad (2)$$

$$\Delta_{min} = -9/100, \ \Delta_{max} = 3/100 \qquad (3)$$

1 Claim, 9 Drawing Sheets

(58) Field of Classification Search
USPC .................................................. 285/334, 333
See application file for complete search history.

(56) References Cited

U.S. PATENT DOCUMENTS

| | | | | |
|---|---|---|---|---|
| 4,192,533 | A | * | 3/1980 | Blose .................. E21B 17/0423 285/334 |
| 4,253,687 | A | * | 3/1981 | Maples ............... E21B 17/0423 285/332.3 |
| 4,662,659 | A | | 5/1987 | Blose et al. |
| 4,696,498 | A | * | 9/1987 | Church ............... E21B 17/0423 285/334 |
| 2015/0069752 | A1 | * | 3/2015 | Farquhar ............. E21B 17/0423 285/334 |

* cited by examiner

THREADED JOINT FOR STEEL PIPE

RELATED APPLICATION DATA

This application is a National Stage Application under 35 U.S.C. 371 of co-pending PCT application number PCT/JP2016/082567 designating the United States and filed Nov. 2, 2016; which claims the benefit of JP application number 2015-244620 and filed Dec. 15, 2015 each of which are hereby incorporated by reference in their entireties.

TECHNICAL FIELD

The present disclosure relates to a threaded joint used for connecting steel pipes.

BACKGROUND ART

In oil wells, natural gas wells etc. (hereinafter collectively referred to as "oil wells"), oil country tubular goods such as casing and tubing are used to produce underground resources. Oil country tubular goods are series of steel pipes which are connected together, and these steel pipes are connected by threaded joints.

Such threaded joints for steel pipe are generally categorized as coupling-type and integral-type. A coupling-type joint connects a pair of pipes, where one of the pipes is a steel pipe and the other pipe is a coupling. In this case, a male thread is provided on the outer periphery of both ends of the steel pipe, while a female thread is provided on the inner periphery of both ends of the coupling. Then, the male thread of the steel pipe is screwed into the female thread of the coupling such that they are fastened together and connected. An integral-type joint connects a pair of pipes that are both steel pipes, and does not use a separate coupling. In this case, a male thread is provided on the outer periphery of one end of a steel pipe, while a female thread is provided on the inner periphery of the other end thereof. Then, the male thread of one steel pipe is screwed into the female thread of another steel pipe such that they are fastened together and connected.

Generally, an end portion of a pipe that includes a male thread and serves as a joint portion is referred to as pin, since it includes an element to be inserted into the female thread. On the other hand, an end portion of a pipe that includes a female thread and serves as a joint portion is referred to as box, since it includes an element that receives the male thread. Since the pin and box are end portions of a pipe, they are tubular in shape.

FIG. 1 is a vertical cross-sectional view of an example of a typical conventional threaded joint for steel pipe. The threaded joint shown in FIG. 1 is a coupling-type threaded joint and includes a pin 110 and a box 120.

The pin 110 includes, beginning with its tip toward its base, a shoulder surface 111, a sealing surface 113 and a male thread 114. The box 120 includes, beginning with its base toward its tip, a shoulder surface 121, a sealing surface 123 and a female thread 124. The shoulder surface 121, sealing surface 123 and female thread 124 of the box 120 are provided so as to correspond to the shoulder surface 111, sealing surface 113 and male thread 114 of the pin 110. The male thread 114 of the pin 110 and the female thread 124 of the box 120 engage each other, and the threaded portions having these threads are trapezoidal threads constituted by taper threads.

The male thread 114 and female thread 124 allow screw-in to each other, and are in tight contact by fitting together upon fastening, thereby achieving an interference fit. As the pin 110 is screwed in, the sealing surfaces 113 and 123 come into contact, are in close contact by fitting together upon fastening, thereby achieving an interference fit. Thus, the sealing surfaces 113 and 123 form a seal portion by metal-to-metal contact. As the pin 110 is screwed in, the shoulder surfaces 111 and 121 come into contact and are pressed against each other, and thus serve as stoppers for limiting the screw-in of the pin 110. Upon fastening, the shoulder surfaces 111 and 121 serve to apply a so-called thread-tightening axial force to the load flank of the male thread 114 of the pin 110.

In a threaded joint with this construction, in addition to the close contact by fitting together between the male thread 114 and female thread 124, the close contact by fitting together between the sealing surfaces 113 and 123 ensure sealing performance.

In recent years, land and offshore wells have become deeper and deeper, which means that oil-well environments have become harsher and harsher with higher temperatures and higher pressures as well as higher corrosion levels. To address such harsh environments, the oil country tubular goods used are often heavy wall steel pipes. A threaded joint for connecting such steel pipes is required to have good sealing performance against an internal pressure and an external pressure.

Conventional techniques for improving the sealing performance of a threaded joint include the following.

FIG. 2 is a vertical cross-sectional view of an example of a conventional threaded joint for steel pipe designed to improve the sealing performance. The threaded joint shown in FIG. 2 includes two seal portions with metal-to-metal contact. Further, shoulder surfaces are provided near the middle of the threaded joint as determined along the pipe-axis direction (see, for example, U.S. Pat. No. 4,662,659).

More specifically, as shown in FIG. 2, the pin 210 includes, beginning with its tip toward its base, a first sealing surface 213, a first male thread 214, a shoulder surface 211, a second sealing surface 216 and a second male thread 217. The box 220 includes, beginning with its base toward its tip, a first sealing surface 223, a first female thread 224, a shoulder surface 221, a second sealing surface 226 and a second female thread 227. The first threaded portion composed of the first male and female threads 214 and 224 and the second threaded portion composed of the second male and female threads 217 and 227 are trapezoidal threads constituted by taper threads.

The taper surface defined by the first threaded portion is closer to the pipe axis CL than the taper surface defined by the second threaded portion because shoulder surfaces 211 and 221 are provided between the first and second threaded portions.

The first male and female threads 214 and 224 allow screw-in to each other, and are in close contact by fitting together upon fastening, thereby achieving an interference fit. The second male and female threads 217 and 227 also achieve an interference fit. As the pin 210 is screwed in, the first sealing surfaces 213 and 223 come into contact and the second sealing surfaces 216 and 226 come into contact, and the first sealing surfaces 213 and 223 and the second sealing surfaces 216 and 226 are in close contact by fitting together each other upon fastening, thereby achieving an interference fit. As the pin 210 is screwed in, the shoulder surfaces 211 and 221 come into contact and are pressed against each other.

In a threaded joint with this construction, the close contact by interference fit between the first sealing surfaces 213 and 223 ensures sealing performance mainly against an internal pressure. Further, the close contact by interference fit between the second sealing surfaces 216 and 226 ensures sealing performance mainly against an external pressure.

DISCLOSURE OF THE INVENTION

In the threaded joint shown in FIG. 2, upon fastening, the shoulder surface 211 of the pin 210 and the shoulder surface 221 of the box 220 are in contact with each other. The tip of the pin 210 does not contact the box 220 even after completion of fastening. Unfortunately, if there is a gap between the tip of the pin 210 and the box 220 upon fastening, crevice corrosion is likely to occur.

An object of the present disclosure is to provide a threaded joint for steel pipe that ensures good sealing performance and reduces crevice corrosion.

A threaded joint for steel pipe according to the present disclosure includes a tubular pin and a tubular box. The pin and the box are fastened together as the pin is screwed into the box. The pin includes, in order from its tip, a first shoulder surface, a first sealing surface, a first male thread constituted by a taper thread, a second shoulder surface, a second sealing surface and a second male thread constituted by a taper thread. The box includes a first shoulder surface, a first sealing surface, a first female thread constituted by a taper thread, a second shoulder surface, a second sealing surface and a second female thread constituted by a taper thread corresponding to the first shoulder surface, first sealing surface, first male thread, second shoulder surface, second sealing surface and second male thread of the pin. The pin includes a nose located between the first shoulder surface and the first sealing surface and contiguous to the first sealing surface. The pin includes an unthreaded extension located between the second shoulder surface and the second sealing surface and contiguous to the second sealing surface. The box includes a recess corresponding to the nose of the pin. The box includes an unthreaded extension corresponding to the unthreaded extension of the pin. Upon fastening, the first shoulder surfaces come into contact, the first sealing surfaces come into contact, the second sealing surfaces come into contact, a gap is formed between the nose of the pin and the recess of the box, a gap is formed between the unthreaded extension of the pin and the unthreaded extension of the box, the first male thread and the first female thread engage each other, and the second male thread and the second female thread engage each other. Supposing that the distance, as measured in a pipe-axis direction, between the first and second shoulder surfaces of the pin before fastening is represented as $L_{pin}$, the distance, as measured in the pipe-axis direction, between the first and second shoulder surfaces of the box before fastening is represented as $L_{box}$, and the interference $\delta_{shld}$ between the second shoulder surface of the pin and the second shoulder surface of the box is defined by Equation (1) given below, then, Equations (2) and (3) given below are satisfied.

[Formula 1]

$$\delta_{shld} = L_{box} - L_{pin} \tag{1}$$

$$P \times \Delta_{min} + \lambda \leq \delta_{shld} \leq P \times \Delta_{max} + \lambda \tag{2}$$

$$\Delta_{min} = -9/100, \Delta_{max} = 3/100 \tag{3}$$

Here, P is the thread pitch of the first male thread, $\Delta_{min}$ is the lower limit of the number of tightening rotations after the first shoulder surfaces come into contact or the second shoulder surfaces come into contact during fastening, $\Delta_{max}$ is the upper limit of the number of tightening rotations, and $\lambda$ is the elongation of the portion of the pin located closer to the tip than the second shoulder surface is during fastening.

Supposing that the inner diameter of the pin is represented as ID, the innermost diameter of the second shoulder surface of the pin is represented as $D_{ms}$, the outermost diameter of the first shoulder surface of the pin is represented as $D_{is}$, and the interference between the first male and female threads is represented as $\delta_{th}$, then, $\lambda$ is represented by Equations (4) and (5) given below.

[Formula 2]

$$D_{int} = (D_{ms} + D_{is})/2 \tag{4}$$

$$\lambda = \left\{ \frac{(D_{int} + ID)}{(D_{int} + ID - 2\delta_{th})} - 1 \right\} L_{pin} \tag{5}$$

The threaded joint for steel pipe according to the present disclosure ensures good sealing performance and reduces crevice corrosion.

EMBODIMENTS FOR CARRYING OUT THE INVENTION

Figure 1:
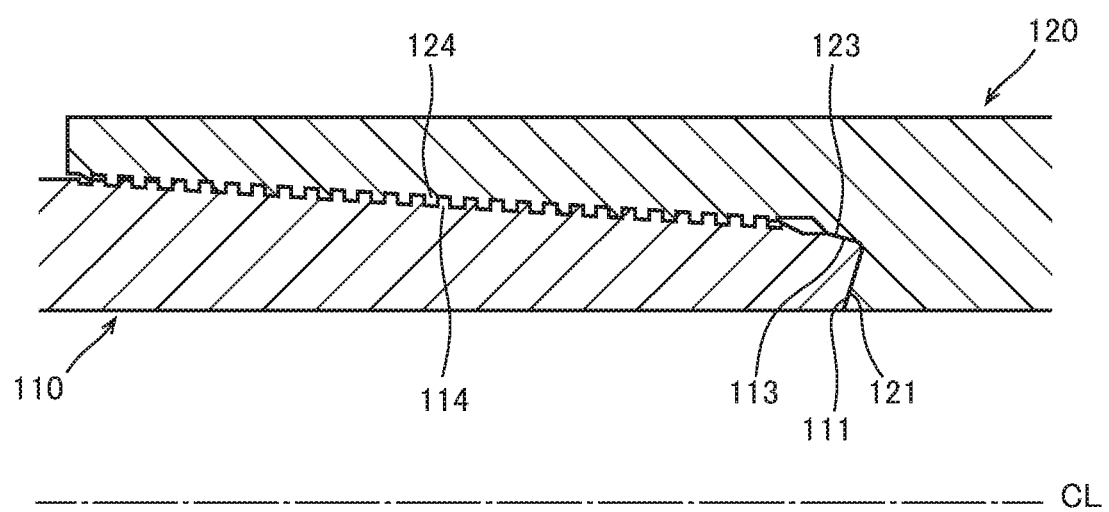
FIG. 1 is a vertical cross-sectional view of an example of a typical conventional threaded joint for steel pipe.
Figure 2:
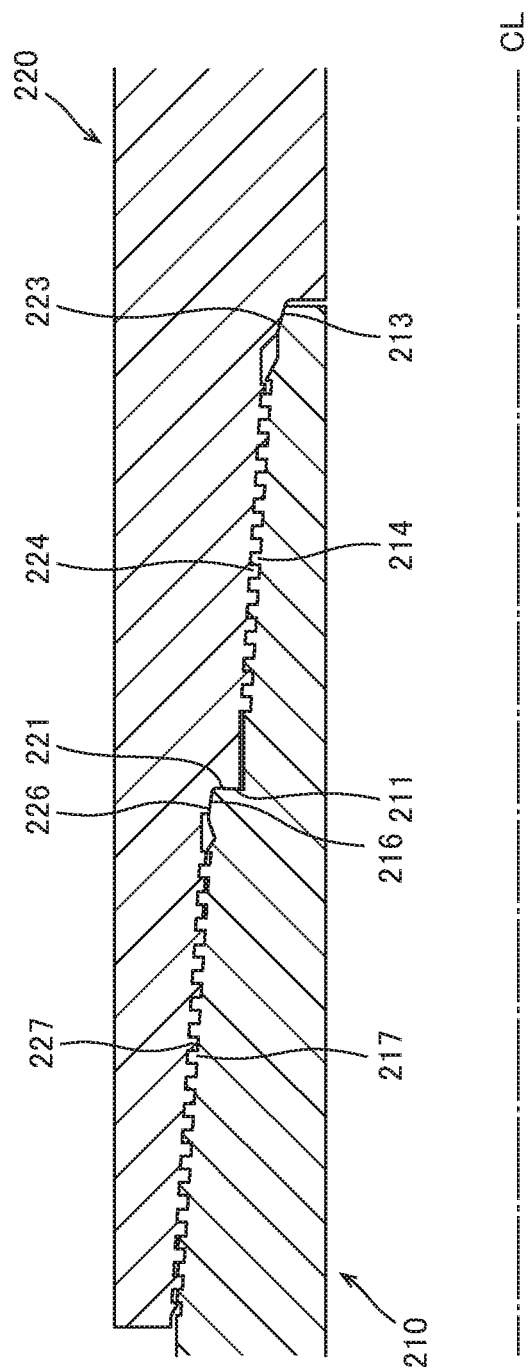
FIG. 2 is a vertical cross-sectional view of an example of a conventional threaded joint for steel pipe with improved sealing performance.

A threaded joint having shoulder surfaces located near the middle as determined along the pipe-axis direction is typically constructed such that the tip of the pin does not contact the box upon fastening, because control of the position at the completion of fastening would be difficult if the shoulder surfaces were to contact each other and the tip of the pin were to contact the box upon fastening.

Unfortunately, if there is a gap between the tip of the pin and the box upon fastening, crevice corrosion is likely to occur. In view of this, the present inventors attempted to make a threaded joint having shoulder surfaces at the interior end as determined along the pipe-axis direction in addition to those near the middle as determined along the pipe-axis direction. A shoulder surfaces at the interior end determined along the pipe-axis direction will be hereinafter referred to as interior shoulder surface or first shoulder surface, and a shoulder surface near the middle as determined along the pipe-axis direction as intermediate shoulder surface or second shoulder surface.

If each of the pin and box includes an interior shoulder surface and an intermediate shoulder surface, it is preferable that the contact between the interior shoulder surfaces and the contact between the intermediate shoulder surfaces begin simultaneously during fastening in order to avoid application of an excessive contact pressure on each shoulder surface. In reality, however, due to fabrication tolerances and other factors, it is difficult to cause the interior shoulder surfaces to begin to be in contact with each other at the same time as the intermediate shoulder surfaces begin to be in contact with each other. In some cases, upon completion of fastening, either the interior shoulder surfaces or the intermediate shoulder surfaces are in contact with each other.

The timing of the contact between the interior shoulder surfaces and that for the intermediate shoulder surfaces will be described below.

In the pin, a first male thread is provided between the interior shoulder surface and intermediate shoulder surface, and a second male thread is provided closer to the base than the intermediate shoulder surface. In the box, first and second female threads are provided to correspond to the first and second male threads. When the pin and box are fastened together, the portions of the pin located closer to the tip than the intermediate shoulder surface reduce in diameter due to the interference fitting of the first male and female threads to be elongated in the pipe-axis direction.

In the pin and box before fastening, the distances between the interior shoulder surfaces and the associated intermediate shoulder surfaces as measured in the pipe-axis direction are represented as $L_{pin}$ [mm] and $L_{box}$ [mm], respectively, and the intermediate shoulder interference $\delta_{shld}$ [mm] is defined as $L_{box}$ minus $L_{pin}$.

If $\delta_{shld}$ is larger than the elongation of the pin, during fastening, the intermediate shoulder surfaces come into contact before the interior shoulder surfaces come into contact. If $\delta_{shld}$ is too large, the intermediate shoulder surfaces and threads yield and plastically deform before the interior shoulder surfaces come into contact, which reduces sealing performance.

The position at the completion of fastening is controlled based on the relationship between the generated torque and the number of tightening rotations (i.e. torque chart). An appropriate torque chart cannot not be obtained if $\delta_{shld}$ is too large and thus plastic deformation of the intermediate shoulder surfaces and/or threads occurs before the interior shoulder surfaces begin to be in contact with each other during fastening. In this case, the position at the completion of fastening cannot be decided.

If $\delta_{shld}$ is too large, the interior shoulder surfaces may not contact each other even when the joint is tightened until plastic deformation occurs in the intermediate shoulder surfaces and/or threads. In this case, a gap is formed between the tip of the pin and the box, as is the case with conventional threaded joints, which means that crevice corrosion can easily occur.

If $\delta_{shld}$ is smaller than the elongation of the pin, during fastening, the interior shoulder surfaces come into contact before the intermediate shoulder surfaces come into contact. In this case, the tip of the pin is certain to contact the box, which means that the above-discussed problem of crevice corrosion does not occur. However, if $\delta_{shld}$ is too small, the interior shoulder surfaces and/or threads yield and plastically deform before the intermediate shoulder surfaces come into contact, which decreases sealing performance. Further, if plastic deformation occurs in the interior shoulder surfaces and threads, an appropriate torque chart cannot be obtained, which means that the position at the completion of fastening cannot be decided.

The present inventors considered these problems and attempted to find the appropriate range of the intermediate shoulder interference $\delta_{shld}$.

Figure 3:
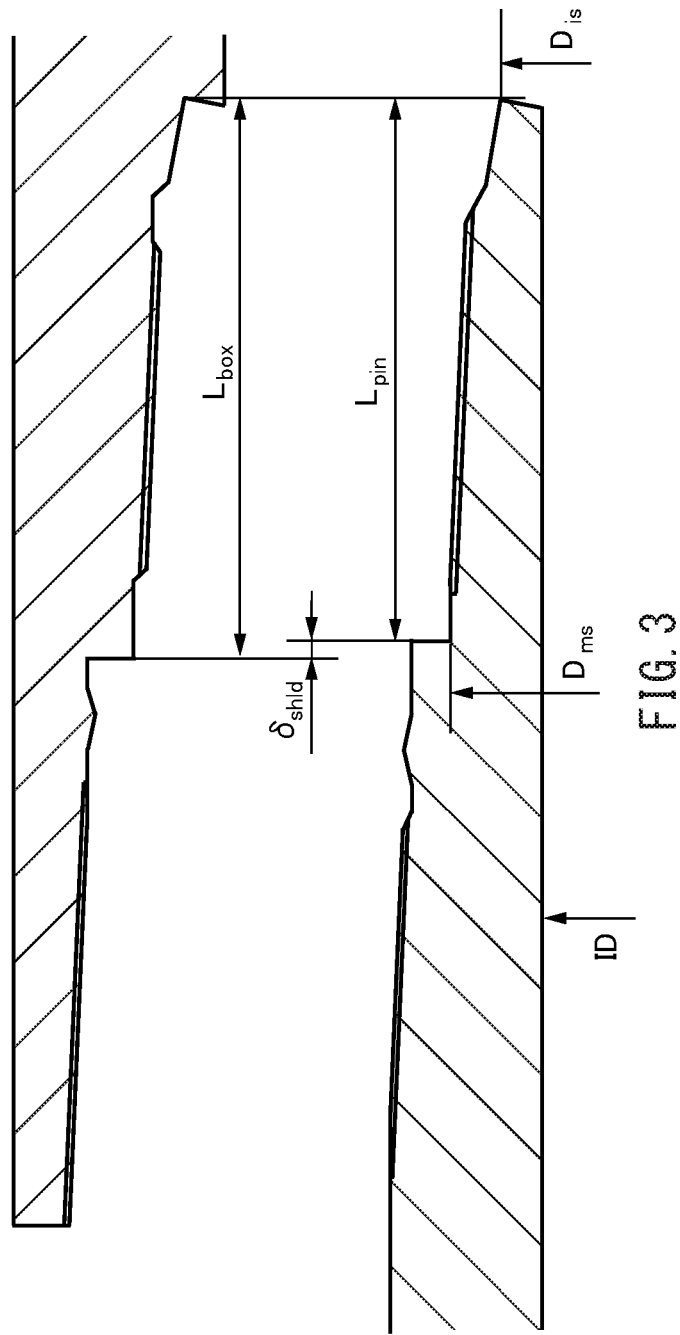
FIG. 3 is a schematic vertical cross-sectional view of a pin and a box used for devising the threaded joint for steel pipe according to an embodiment.

FIG. 3 is a schematic vertical cross-sectional view of the pin and box used for this attempt. FIG. 3 shows the pin and box before fastening. In the pin shown in FIG. 3, ID is the inner diameter of the pipe [mm], $D_{ms}$ is the innermost diameter of the intermediate shoulder surface [mm], and $D_{is}$ is the outermost diameter of the interior shoulder surface [mm].

Figure 4:
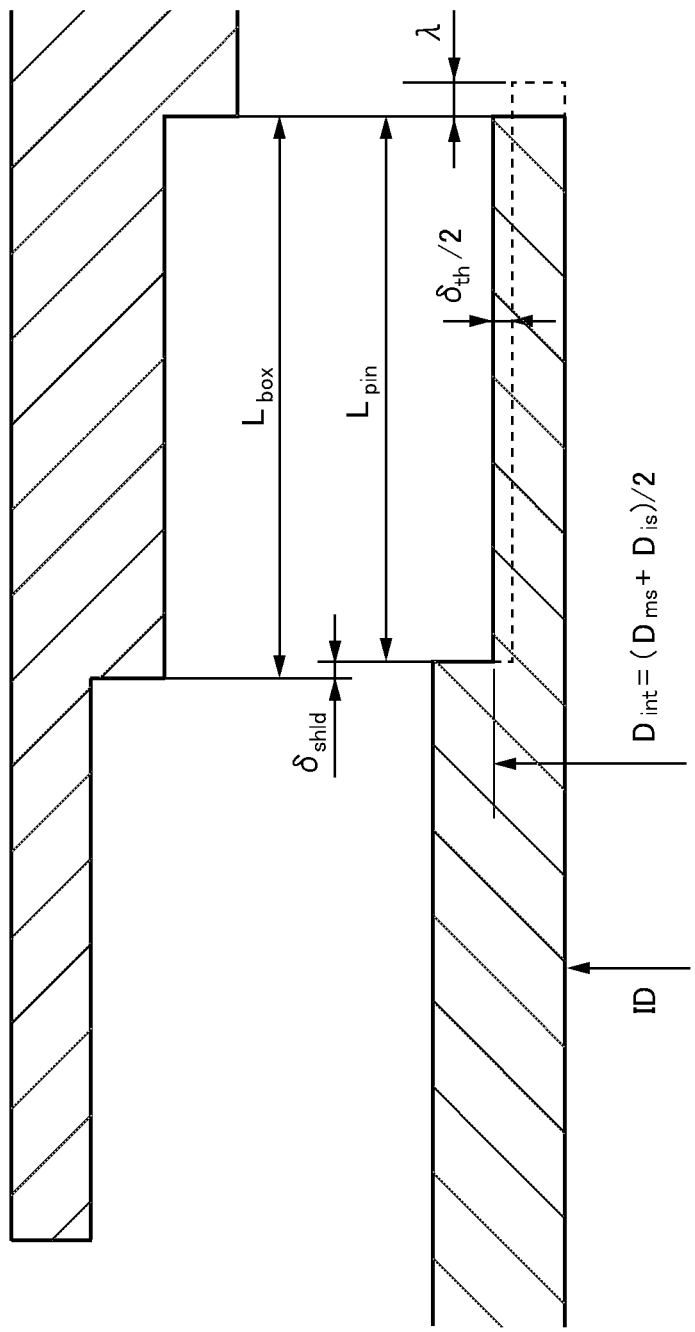
FIG. 4 shows a simplified model of the pin and box shown in FIG. 3.

FIG. 4 shows a simplified model of the pin and box shown in FIG. 3. In FIG. 4, the pin portion of the simplified model is represented by a stepped cylinder composed of a small-diameter portion and a large-diameter portion. The small-diameter portion corresponds to the portion of the pin which is located closer to the tip than the intermediate shoulder surface and on which the first male thread is provided. The outer diameter $D_{int}$ [mm] of the small-diameter portion is defined by the following equation, Equation (4):

[Formula 3]

$$D_{int}=(D_{ms}+D_{is})/2 \qquad (4)$$

Supposing that the interference fitting with the interference $\delta_{th}$ between the first male thread of the pin and the first female thread of the box causes the small-diameter portion to be elongated by $\lambda$ [mm] in the pipe-axis direction during fastening, then, Equations (6) to (8) are established, where V is the volume [mm³] of the small-diameter portion before deformation and V' is the volume [mm³] thereof after deformation and it is supposed that the volume and wall thickness remain the same before and after deformation.

[Formula 4]

$$V = \frac{\pi}{4}(D_{int}^2 - ID^2)L_{pin} = \frac{\pi}{4}(D_{int} - ID)(D_{int} + ID)L_{pin} \qquad (6)$$

$$V' = \frac{\pi}{4}((D_{int} - \delta_{th})^2 - (ID - \delta_{th})^2)(L_{pin} + \lambda) \qquad (7)$$
$$= \frac{\pi}{4}(D_{int} - ID)(D_{int} + ID - 2\delta_{th})(L_{pin} + \lambda)$$

$$V = V' \qquad (8)$$

Equations (6) to (8) give the elongation $\lambda$ expressed by the following equation, Equation (5):

[Formula 5]

$$\lambda = \left\{\frac{(D_{int} + ID)}{(D_{int} + ID - 2\delta_{th})} - 1\right\}L_{pin} \qquad (5)$$

If the elongation $\lambda$ of the pin is equal to the intermediate shoulder interference $\delta_{shld}$, then, during the process of fastening of the pin and box, the intermediate shoulder surfaces begin to be in contact with each other at the same time as the intermediate shoulder surfaces begin to be in contact with each other. If $\lambda$ is larger than $\delta_{shld}$, then, during the process of fastening, the interior shoulder surfaces come into contact before the intermediate shoulder surfaces come into contact. If λ is smaller than $\delta_{shld}$, then, during the process of fastening, the intermediate shoulder surfaces come into contact before the interior shoulder surfaces come into contact.

As discussed above, if λ≠$\delta_{shld}$, the time point at which the interior shoulder surfaces come into contact is different from the time point at which the intermediate shoulder surfaces come into contact. The number of tightening rotations between the point at which one pair of shoulder surfaces come into contact and the point at which the other pair of shoulder surfaces come into contact, i.e. the difference Δ [rotations] between the number of tightening rotations from the beginning of fastening until one pair of shoulder surfaces come into contact and the number of tightening rotations from the beginning of fastening until the other pair of shoulder surfaces come into contact, is represented by the following equation, Equation (9):

[Formula 6]

$$\Delta = \frac{\delta_{shld} - \lambda}{P} \quad (9)$$

where P is the thread pitch [mm] of the first male thread.

In Equation (9), if Δ is positive, the intermediate shoulder surfaces come into contact first; if Δ is negative, the interior shoulder surfaces come into contact first.

The lower and upper limits of the number of tightening rotations to exhibit sufficient sealing performance will be represented as $\Delta_{min}$ and $\Delta_{max}$, respectively. Then, to ensure good sealing performance, after one pair of shoulder surfaces come into contact, fastening must be completed by a number of tightening rotations that is not smaller than $\Delta_{min}$ and not larger than $\Delta_{max}$. That is, the difference Δ between the numbers of tightening rotations must meet following equation, Equation (10):

[Formula 7]

$$\Delta_{min} \leq \Delta \leq \Delta_{max} \quad (10)$$

Figure 5:
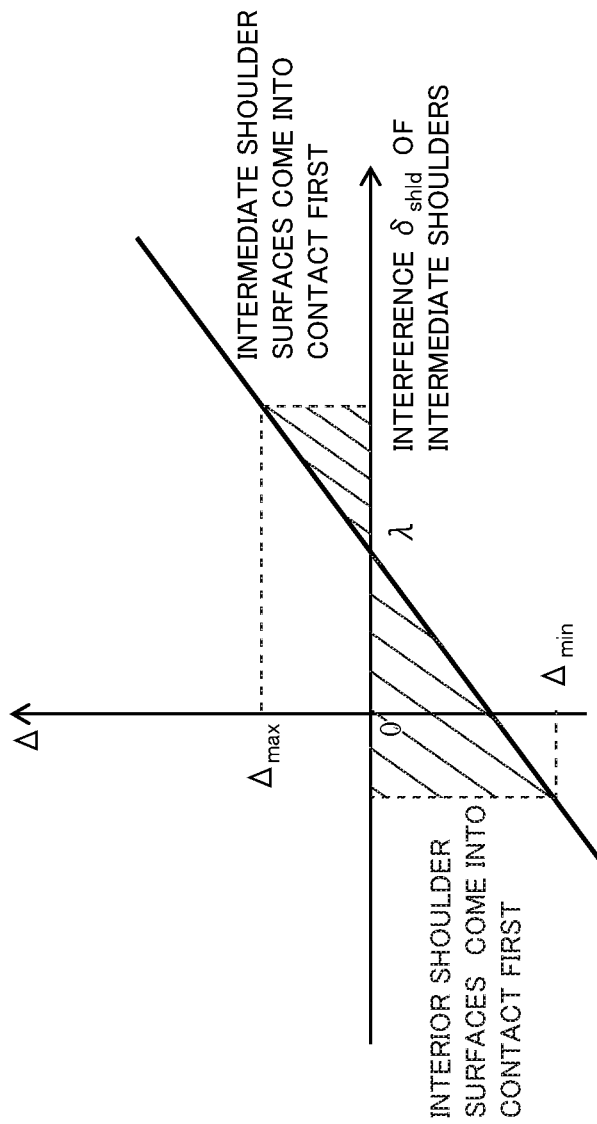
FIG. 5 is a graph showing the relationship between the difference $\Delta$ in the number of tightening rotations and the interference $\delta_{shld}$ between the intermediate shoulders.

FIG. 5 is a graph showing the relationship between the difference Δ between the numbers of tightening rotations represented by Equation (9), and the intermediate shoulder interference $\delta_{shld}$. If A meets Equation (10), $\delta_{shld}$ is in the hatched sections in FIG. 5. The present inventors did extensive research and found the preferred values of $\Delta_{min}$ and $\Delta_{max}$ and the appropriate range of $\delta_{shld}$, and arrived at the arrangement of the threaded joint for steel pipe according to the embodiment.

The threaded joint for steel pipe according to the embodiment includes a tubular pin and a tubular box. The pin and the box are fastened together as the pin is screwed into the box. The pin includes, in order from its tip, a first shoulder surface, a first sealing surface, a first male thread constituted by a taper thread, a second shoulder surface, a second sealing surface and a second male thread constituted by a taper thread. The box includes a first shoulder surface, a first sealing surface, a first female thread constituted by a taper thread, a second shoulder surface, a second sealing surface and a second female thread constituted by a taper thread corresponding to the first shoulder surface, first sealing surface, first male thread, second shoulder surface, second sealing surface and second male thread of the pin. The pin includes a nose located between the first shoulder surface and the first sealing surface and contiguous to the first sealing surface. The pin includes an unthreaded extension located between the second shoulder surface and the second sealing surface and contiguous to the second sealing surface. The box includes a recess corresponding to the nose of the pin. The box includes an unthreaded extension corresponding to the unthreaded extension of the pin. Upon fastening, the first shoulder surfaces come into contact, the first sealing surfaces come into contact, the second sealing surfaces come into contact, a gap is formed between the nose of the pin and the recess of the box, a gap is formed between the unthreaded extension of the pin and the unthreaded extension of the box, the first male thread and the first female thread engage each other, and the second male thread and the second female thread engage each other. Supposing that the distance, as measured in a pipe-axis direction, between the first and second shoulder surfaces of the pin before fastening is represented as $L_{pin}$, the distance, as measured in the pipe-axis direction, between the first and second shoulder surfaces of the box before fastening is represented as $L_{box}$, and the interference $\delta_{shld}$ between the second shoulder surface of the pin and the second shoulder surface of the box is defined by Equation (1) given below, then, Equations (2) and (3) given below are satisfied.

[Formula 8]

$$\delta_{shld} = L_{box} - L_{pin} \quad (1)$$

$$P \times \Delta_{min} + \lambda \leq \delta_{shld} \leq P \times \Delta_{max} + \lambda \quad (2)$$

$$\Delta_{min} = -9/100, \Delta_{max} = 3/100 \quad (3)$$

Here, P is the thread pitch of the first male thread, $\Delta_{min}$ is the lower limit of the number of tightening rotations after the first shoulder surfaces come into contact or the second shoulder surfaces come into contact during fastening, $\Delta_{max}$ is the upper limit of the number of tightening rotations, and λ is the elongation of the portion of the pin located closer to the tip than the second shoulder surface is during fastening.

Supposing that the inner diameter of the pin is represented as ID, the innermost diameter of the second shoulder surface of the pin is represented as $D_{ms}$, the outermost diameter of the first shoulder surface of the pin is represented as $D_{is}$, and the interference between the first male and female threads is represented as $\delta_{th}$, then, λ is represented by Equations (4) and (5) given below.

[Formula 9]

$$D_{int} = (D_{ms} + D_{is})/2 \quad (4)$$

$$\lambda = \left\{ \frac{(D_{int} + ID)}{(D_{int} + ID - 2\delta_{th})} - 1 \right\} L_{pin} \quad (5)$$

In a threaded joint that satisfies Equations (2) and (3), even if the second shoulder surfaces come into contact first, the first shoulder surfaces come into contact by a number of tightening rotations not smaller than $\Delta_{min}$, and not larger than $\Delta_{max}$ after the second shoulder surfaces come into contact, thereby completing fastening. This will ensure good sealing performance and prevent formation of a gap between the tip of the pin and the box, thereby reducing crevice corrosion facilitated by this gap.

If the intermediate shoulder interference $\delta_{shld}$ is set to a value that satisfies Equations (2) and (3), during the process of fastening, the time point at which the first shoulder surfaces come into contact is not significantly different from the time point at which the second shoulder surfaces come into contact. This will prevent excessive plastic deformation in the shoulder surfaces that have begun to come into contact first, thereby ensuring good sealing performance.

Even if the first shoulder surfaces are in contact with each other and the second shoulder surfaces are not in contact with each other upon completion of fastening, no large gap is formed between the second shoulder surfaces if the intermediate shoulder interference $\delta_{shld}$ is set to a value that satisfies Equations (2) and (3). Thus, if an excessive compression load is applied, the second shoulder surfaces also contact each other, thereby reducing decrease in compression resistance and decrease in sealing performance.

Embodiments will now be described in more detail with reference to the drawings. The same or corresponding components in the drawings are labeled with the same reference characters, and their description will not be repeated. For convenience of explanation, in the drawings, components may be shown in a simplified or schematic manner or some components may not be shown.

[Construction of Threaded Joint for Steel Pipe]

Figure 6:
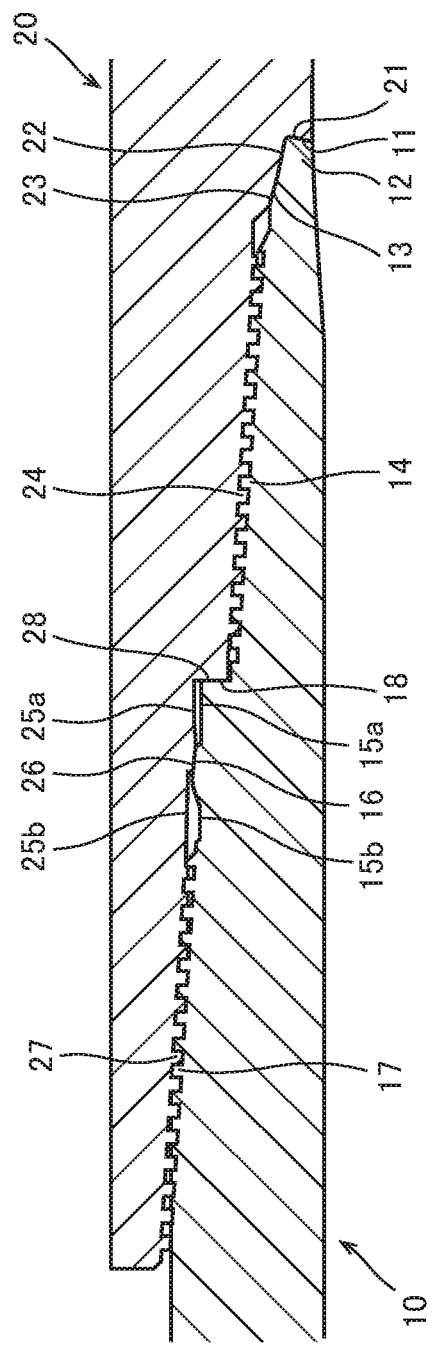
FIG. 6 is a vertical cross-sectional view of a threaded joint for steel pipe according to the embodiment.
Figure 7:
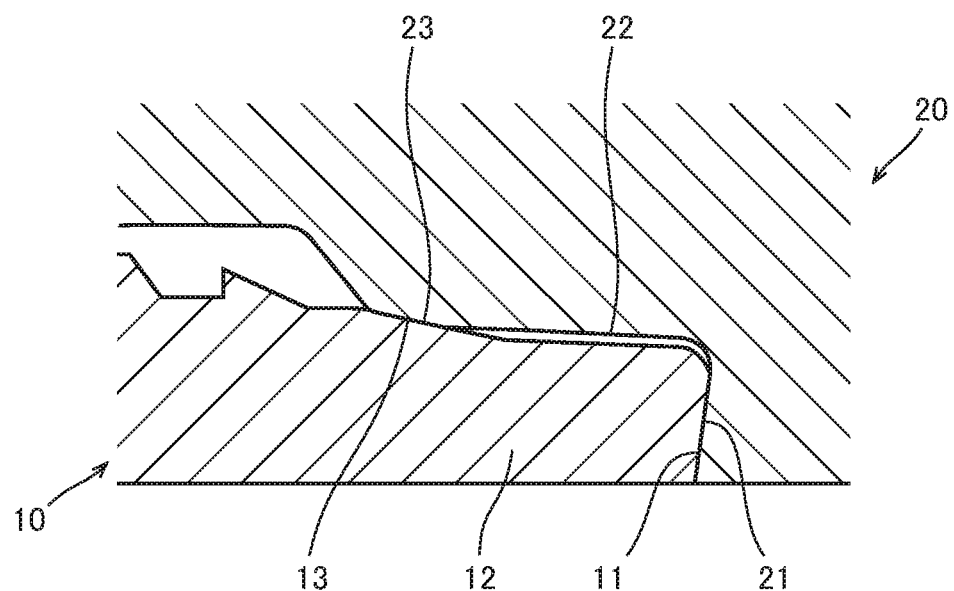
FIG. 7 is an enlarged vertical cross-sectional view of a portion of the threaded joint of FIG. 6 located near the interior end as determined along the pip-axis direction.
Figure 8:
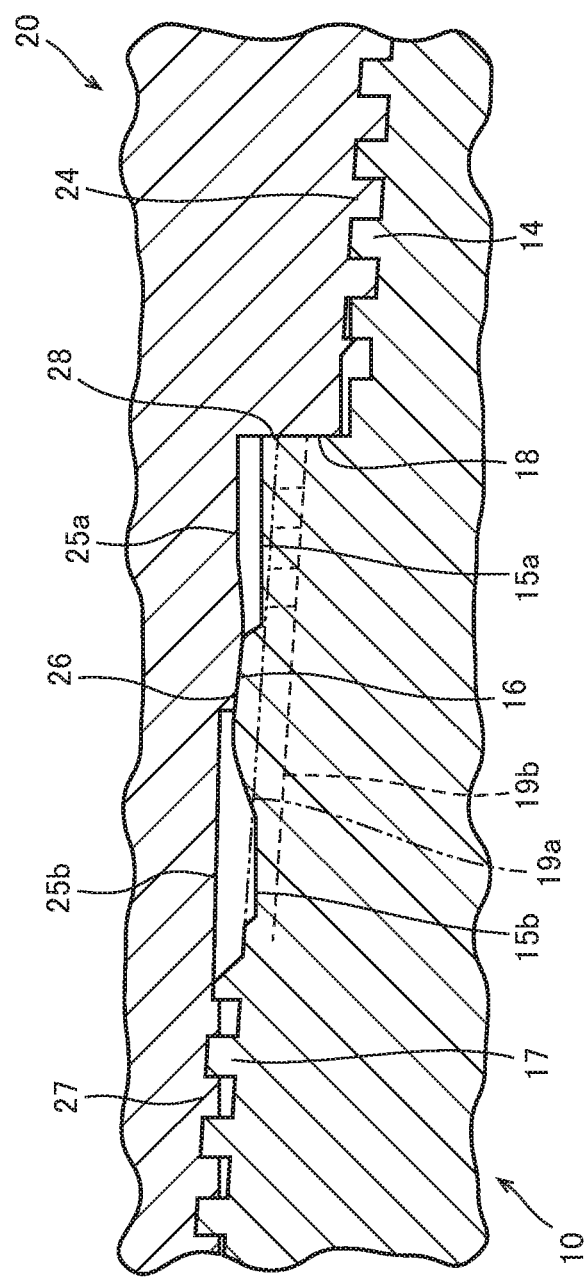
FIG. 8 is an enlarged vertical cross-sectional view of a portion of the threaded joint of FIG. 6 located near the middle as determined along the pipe-axis direction.

FIG. 6 is a vertical cross-sectional view of a threaded joint for steel pipe according to an embodiment. The threaded joint is a coupling-type threaded joint and is composed of a pin 10 and a box 20. FIG. 7 is an enlarged vertical cross-sectional view of the portion of the threaded joint of FIG. 6 located near the tip of the pin 10. FIG. 8 is an enlarged vertical cross-sectional view of the portion of the threaded joint of FIG. 6 located near the middle as determined along the pipe-axis direction. As determined along the pipe-axis direction, the direction toward the tip of the pin 10 and the direction toward the base of the box 20 may be hereinafter referred to as "toward the interior" or "forward", and the direction toward the base of the pin 10 and the direction toward the tip of the box 20 as "toward the exterior" or "rearward".

The pin 10 includes, beginning with its tip toward its base, a first shoulder surface 11, a nose 12, a first sealing surface 13, a first male thread 14, a second shoulder surface 18, a first unthreaded extension 15a, a second sealing surface 16, a second unthreaded extension 15b, and a second male thread 17. The first and second sealing surfaces 13 and 16 are tapered in shape. More exactly, each of the first and second sealing surfaces 13 and 16 has the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The nose 12 is cylindrical in shape, and is contiguous to the first sealing surface 13 located toward the interior and extends in the pipe-axis direction. The outer periphery of the nose 12 may be a tapered surface with a slope equal to that of the tapering of the first sealing surface 13 or a smaller (i.e. gentle) or larger (i.e. steep) slope. If the outer periphery of the nose 12 is a tapered surface, this outer periphery has, more exactly, the shape of a face corresponding to the periphery of a truncated cone decreasing in diameter toward the tip, or the shape obtained by combining the periphery of such a truncated cone and a face corresponding to the periphery of a solid of revolution obtained by rotating a curve such as an arc about the pipe axis CL.

The first shoulder surface 11 is provided on the tip of the nose 12. The first shoulder surface 11 is a toroidal surface that is substantially perpendicular to the pipe axis CL. More exactly, the first shoulder surface 11 is slightly inclined such that its outer periphery is closer to the tip of the pin 10.

The second shoulder surface 18 is located between the first male thread 14 located toward the interior and the first unthreaded extension 15a. The second shoulder surface 18 is contiguous to the first unthreaded extension 15a. In the present embodiment, the second shoulder surface 18 is a toroidal surface perpendicular to the pipe axis CL. Alternatively, similar to the first shoulder surface 11 on the tip of the pin 10, the second shoulder surface 18 may be slightly inclined such that its outer periphery is closer to the tip of the pin 10.

The first unthreaded extension 15a is forwardly contiguous to the second sealing surface 16 located toward the exterior and extends in the pipe-axis direction. The first male thread 14 located toward the interior is contiguous to the first unthreaded extension 15a. The second unthreaded extension 15b is rearwardly contiguous to the second sealing surface 16 located toward the exterior and extends in the pipe-axis direction. The second male thread 17 located toward the exterior is contiguous to the second unthreaded extension 15b. The outer periphery of the first unthreaded extension 15a may have any shape that ensures sufficient stiffness, and may be a cylindrical surface, for example, or have a tapering that is smaller (or gentler) than the tapering of the threaded portion with the first thread 14, or may be a curved surface. The same applies to the outer periphery of the second unthreaded extension 15b.

The box 20 includes, beginning with its base toward its tip, a first shoulder surface 21, a recess 22, a first sealing surface 23, a first female thread 24, a second shoulder surface 28, a first unthreaded extension 25a, a second sealing surface 26, a second unthreaded extension 25b, and a second female thread 27. The first shoulder surface 21, recess 22, first sealing surface 23, first female thread 24, second shoulder surface 28, first unthreaded extension 25a, second sealing surface 26, second unthreaded extension 25b and second female thread 27 of the box 20 are provided to correspond to the first shoulder surface 11, nose 12, first sealing surface 13, first male thread 14, second shoulder surface 18, first unthreaded extension 15a, second sealing surface 16, second unthreaded extension 15b and second male thread 17 of the pin 10.

FIGS. 6 and 7 show an implementation where the first sealing surface 23 of the box 20 protrudes toward the first sealing surface 13 of the pin 10. Alternatively, the first sealing surface 23 of the box 20 may not protrude. In such implementations, the first sealing surface 13 of the pin 10 protrudes toward the first sealing surface 23 of the box 20.

The first male thread 14 of the pin 10 and the first female thread 24 of the box 20 are trapezoidal threads constituted by taper threads that engage each other, and constitute the first threaded portion located toward the interior. The second male thread 17 of the pin 10 and the second female thread 27 of the box 20 are also trapezoidal threads constituted by taper threads that engage each other, and constitute the second threaded portion located toward the exterior.

The tapered surface defined by the first threaded portion is located closer to the pipe axis CL than the taper surface of the second threaded portion, because the second shoulder surfaces 18 and 28 are provided between the first threaded portion (i.e. first male and female threads 14 and 24) and the second threaded portion (i.e. second male and female threads 17 and 27). Thus, those portions of the pin 10 that have the first male thread 14 and first sealing surface 13 located toward the interior have small outer diameters and these portions have small wall thicknesses. On the other hand, those portions of the pin 10 that have the second sealing surface 16 and second male thread 17 located toward the exterior have large outer diameters and these portions have large wall thicknesses.

The first male and female threads 14 and 24 allow screw-in to each other, and are in close contact by fitting together upon fastening, thereby achieving an interference fit. The second male and female threads 17 and 27 also achieve an interference fit.

As the pin 10 is screwed in, the first sealing surfaces 13 and 23 come into contact and the second sealing surfaces 16 and 26 come into contact, are in close contact by fitting together upon fastening, thereby achieving an interference fit. Thus, the first sealing surfaces 13 and 23 form a first seal portion by metal-to-metal contact, and the second sealing surfaces 16 and 26 form a second seal portion by metal-to-metal contact.

Upon fastening, a gap is formed between the nose 12 of the pin 10 and the recess 22 of the box 20, a gap is formed between the first unthreaded extension 15a of the pin 10 and the first unthreaded extension 25a of the box 20, and a gap is formed between the second unthreaded extension 15b of the pin 10 and the second unthreaded extension 25b of the box 20.

Upon fastening, the first shoulder surfaces 11 and 21 are pressed against each other to come into contact. The press contact between the first shoulder surfaces 11 and 21 apply a thread-tightening axial force mainly to the load flank of the first male thread 14 of the pin 10. In some implementations, the second shoulder surfaces 18 and 28 may contact each other upon fastening; in other implementations, they may not contact each other upon completion of fastening and may face each other with a gap left in between. If the second shoulder surfaces 18 and 28 are in press contact, a thread-tightening axial force is applied mainly to the load flank of the second male thread 17 of the pin 10.

The arrangement for causing, upon fastening, the first shoulder surfaces 11 and 21 to contact each other and the second shoulder surfaces 18 and 28 to contact each other or come sufficiently close to each other will be described below.

Figure 9:
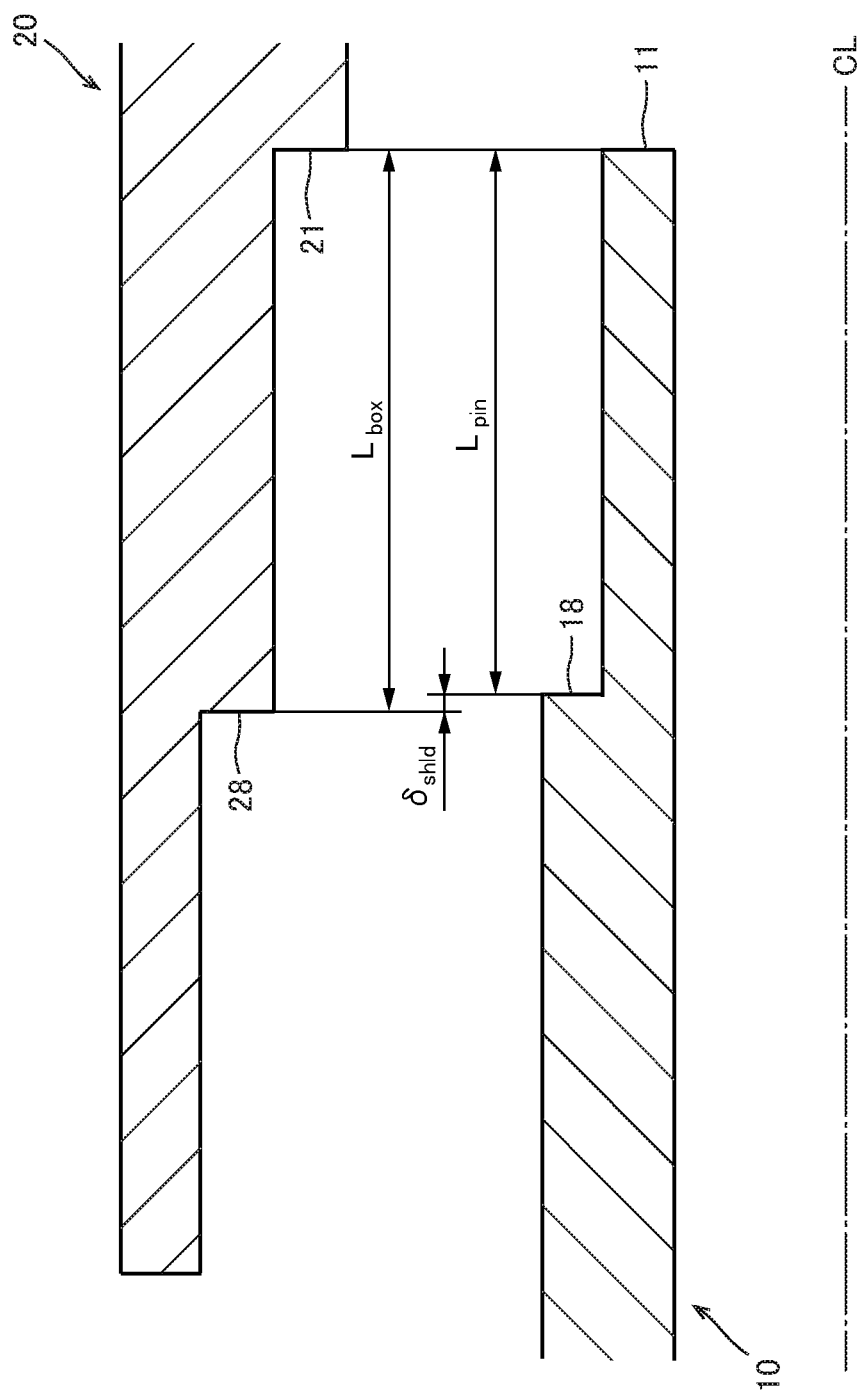
FIG. 9 is a simplified vertical cross-sectional view of the pin and box of the threaded joint shown in FIG. 6.

FIG. 9 is a schematic vertical cross-sectional view of the pin 10 and box 20 before fastening. As shown in FIG. 9, the distance, as measured in the pipe-axis direction, between the first and second shoulder surfaces 11 and 18 of the pin 10 before fastening will be represented as $L_{pin}$ [mm]. The distance, as measured in the pipe-axis direction, between the first and second shoulder surfaces 21 and 28 of the box 20 before fastening will be represented as $L_{box}$ [mm].

The first shoulder surfaces 11 and 12 and the second shoulder surfaces 18 and 28 are toroidal surfaces that cross the pipe-axis direction. The first shoulder surfaces 11 and 21 and the second shoulder surfaces 18 and 28 may be perpendicular to the pipe axis CL, or may be angled relative to a plane perpendicular to the pipe axis CL. $L_{pin}$ is the distance between the interior-most point of the first shoulder surface 11 and the interior-most point of the second shoulder surface 18 as measured in the pipe-axis direction as can be seen in a cross section, containing the pipe axis CL, of the pin 10 before fastening. $L_{box}$ is the distance between the interior-most point of the first shoulder surface 21 and the interior-most point of the second shoulder surface 28 as measured in the pipe-axis direction as can be seen in a cross section, containing the pipe axis CL, of the box 20 before fastening.

As shown in Equation (1) given below, the intermediate shoulder interference $\delta_{shld}$ [mm] is defined using $L_{pin}$ and $L_{box}$. $\delta_{shld}$ is the interference between the second shoulder surfaces 18 and 20 determined when the deformation due to fastening is not taken into consideration.

[Formula 10]

$$\delta_{shld} = L_{box} - L_{pin} \qquad (1)$$

During an actual fastening, the interference fit of the first threaded portion elongates the portion of the pin 10 that is located closer to the tip than the second shoulder surface 18 by λ [mm]. In view of this, the positional relationship between the first shoulder surfaces 11 and 21 and the second shoulder surface 18 and 28 must be determined taking account of the elongation λ of the pin 10. In the present embodiment, an intermediate shoulder interference $\delta_{shld}$ is determined such that the following equations, Equations (2) and (3) are satisfied.

[Formula 11]

$$P \times \Delta_{min} + \lambda \leq \delta_{shld} \leq P \times \Delta_{max} + \lambda \qquad (2)$$

$$\Delta_{min} = -9/100, \Delta_{max} = 3/100 \qquad (3)$$

Here, P is the thread pitch of the first male thread 14 (FIG. 6). $\Delta_{min}$ and $\Delta_{max}$ are the lower and upper limits, respectively, of the difference between the number of tightening rotations registered when one pair of the first shoulder surfaces 11 and 21 and the second shoulder surfaces 18 and 28 come into contact and the number of tightening rotations registered when the other pair of shoulder surfaces come into contact during the process of fastening. If the difference Δ between the numbers of tightening rotations is not smaller than $\Delta_{min}$ and not larger than $\Delta_{max}$ defined in Equation (3), the joint exhibits sufficient sealing performance.

The elongation λ of the pin 10 can be calculated by the following equations, Equations (4) and (5):

[Formula 12]

$$D_{int} = (D_{ms} + D_{is})/2 \qquad (4)$$

$$\lambda = \left\{ \frac{(D_{int} + ID)}{(D_{int} + ID - 2\delta_{th})} - 1 \right\} L_{pin} \qquad (5)$$

In Equations (4) and (5), before fastening, the inner diameter of the pin is represented as ID, the outer diameter of the first shoulder surface 11 as $D_{is}$, and the innermost diameter of the second shoulder surface 18 as $D_{ms}$. $\delta_{th}$ is the interference of the first threaded portion.

Here, the interference $\delta_{th}$ of the first threaded portion is the value obtained by subtracting the thread crest diameter of the first female thread 24 as measured at that location in a cross section, containing the pipe axis CL, of the box 20 before fastening which is located rearward from the interior-most point of the first shoulder surface 21 by $L_{pin}/2$, from the thread root diameter of the first male thread 14 at that location on a cross section, containing the pipe axis CL, of the pin 10 before fastening which is located rearward from the interior-most point of the first shoulder surface 11 by $L_{pin}/2$.

During the process of fastening, the first shoulder surfaces 11 and 21 may contact each other at the same time as the second shoulder surfaces 18 and 28, or one of these pairs may come into contact first. Preferably, the second shoulder surfaces 18 and 28, which have greater areas, contact each other earlier than, or at the same as, the first shoulder surfaces 11 and 21. The second shoulder surfaces 18 and 28 may be caused to contact each other with preference by setting the intermediate shoulder interference $\delta_{shld}$ to a value equal to or larger than the elongation λ of the pin 10. Alternatively, as discussed above, upon fastening, the second shoulder surfaces 18 and 28 may not contact each other and only the first shoulder surfaces 11 and 21 may contact each other.

Effects

In the threaded joint according to the present embodiment, first shoulder surfaces 11 and 21 are provided on the interior end as determined along the pipe-axis direction, while second shoulder surfaces 18 and 28 are provided near the middle as determined along the pipe-axis direction. According to the present embodiment, the intermediate shoulder interference $\delta_{shld}$ is set to a value that satisfies Equations (2) and (3) given above. In this arrangement, even if the second shoulder surfaces 18 and 28 contact each other first, the first shoulder surfaces 11 and 21 can be brought into contact with a number of subsequent tightening rotations that will not decrease sealing performance, i.e. not smaller than $\Delta_{min}$ and not larger than $\Delta_{max}$, thereby completing fastening. This will ensure good sealing performance and prevent a gap from being formed between the tip of the pin 10 and the box 20, thereby preventing crevice corrosion.

According to the present embodiment, the intermediate shoulder interference $\delta_{shld}$ is set to a value that satisfies Equations (2) and (3) given above and the first shoulder surfaces 11 and 21 and second shoulder surfaces 18 and 28 are positioned in an appropriate positional relationship. Thus, during the process of fastening, the time point at which the first shoulder surfaces 11 and 21 come into contact is not significantly different from the time point at which the second shoulder surfaces 18 and 28 come into contact. This will prevent excessive plastic deformation in the shoulder surfaces that begin to be in contact first and threads, thereby ensuring good sealing performance.

Even if the first shoulder surfaces 11 and 21 are in contact with each other and the second shoulder surfaces 18 and 28 are not in contact with each other upon completion of fastening, a large gap is not created between the second shoulder surfaces 18 and 28 if the intermediate shoulder interference $\delta_{shld}$ is set to a value that satisfies Equations (2) and (3) given above. Thus, if an excessive compression load is applied, the second shoulder surfaces also come into contact. This will reduce decrease in compression resistance and/or decrease in sealing performance.

The threaded joint according to the present embodiment includes first shoulder surfaces 11 and 21 and second shoulder surfaces 18 and 28. In this arrangement, a larger area receives a compression load than in a conventional threaded joint in which shoulder surfaces are provided at only one location. This will ensure high compression resistance.

In the threaded joint according to the present embodiment, the close contact by fitting together between the first sealing surfaces 13 and 23 located toward the interior ensures sealing performance mainly against an internal pressure. Further, the close contact by fitting together between the second sealing surfaces 16 and 26 located toward the exterior ensures sealing performance mainly against an external pressure.

Particularly, since the pin 10 includes a first unthreaded extension 15a forwardly contiguous to the second sealing surface 16 located toward the exterior, the stiffness of the first unthreaded extension 15a increases the diameter-reduction resistance of the portion of the pin 10 that has the second sealing surface 16. Thus, even when an external pressure is applied to the threaded joint, the diameter-reduction deformation of the pin 10 is reduced, and decrease in the contact pressure between the second sealing surfaces 16 and 26 is reduced. This will improve sealing performance against an external pressure. Further, the box 20 includes a first unthreaded extension 25a corresponding to the portion of the pin 10 that has the first unthreaded extension 15a and a gap is created between the first unthreaded extensions 15a and 25a upon fastening. This will allow extra dope applied to the joint to be contained in the gap upon fastening. This will prevent unintended decrease in the contact pressure between the second sealing surfaces 16 and 26 that may be caused by an increase in the pressure of the dope.

The pin 10 and box 20 include second unthreaded extensions 15b and 25b rearwardly contiguous to the second sealing surfaces 16 located toward the exterior, and a gap is created between the second unthreaded extensions 15b and 25b upon fastening. This reduces the decrease in contact pressure due to the decrease in the actual interference between the second sealing surfaces 16 and 26 produced by the interference-fitting effect of the second threaded portion. This will improve sealing performance against an external pressure.

Further, the pin 10 includes a nose 12 contiguous to the first sealing surface 13 located toward the interior. The box 20 includes a recess 22 corresponding to the portion of the pin 10 that has the nose 12. A gap is created between the nose 12 and recess 22 upon fastening. For example, when an excessive tensile load is applied to the threaded joint, the first shoulder surface 11 of the pin 10 becomes separated from the first shoulder surface 21 of the box 20, decreasing the actual interference between the first sealing surfaces 13 and 23, which tends to loosen the contact. Even in such cases, the elastic recovery of the nose 12 provides the effect of amplification of the contact pressure between the first sealing surfaces 13 and 23. Thus, decrease in contact pressure is reduced as a whole, which will provide high sealing performance against an internal pressure even when an excessive tensile load is applied.

In the threaded joint according to the present embodiment, the provision of the second shoulder surfaces 18 and 28 reduces the wall thicknesses of the portions of the pin 10 that have the first male thread 14 and first sealing surface 13 located toward the interior. Thus, when an internal pressure is applied to the threaded joint, the portions with the decreased wall thickness effectively deform such that their diameter increases. This will amplify the contact pressure between the first sealing surfaces 13 and 23.

The provision of the second shoulder surfaces 18 and 28 increases the wall thicknesses of the portions of the pin 10 that have the second sealing surface 16 and second male thread 17 located toward the exterior such that their stiffness becomes relatively high. Thus, when an external pressure is applied to the threaded joint, the diameter-reduction deformation of the affected portions is reduced, thereby maintaining the contact pressure between the second sealing surfaces 16 and 26 at high levels.

Suitable implementations of the threaded joint according to the present embodiment will be provided below as supplements.

Supposing that, in the pin 10, the area of a cross section of the steel-pipe body perpendicular to the pipe axis CL is represented as $A_0$, and the total of the projected areas of the first and second shoulder surfaces 11 and 18 on a plane perpendicular to the pipe axis CL is represented as $A_2$, then, it is preferable that the ratio between these areas (hereinafter referred to as "area ratio of the total shoulder area to the steel-pipe body), $A_2/A_0$, is 30% or higher. More preferably, $A_2/A_0$ is 35% or higher. The reasons for this are as follows: $A_2/A_0$ essentially depends on the areas of the first and second shoulder surfaces 11 and 18. If $A_2/A_0$ is small, this means that the areas of the first and second shoulder surfaces 11 and 18 are small such that, when an excessive compression load is applied to the threaded joint, the first and second shoulder surfaces 11 and 18 cannot resist this compression load. Then, the first shoulder surface 11, as well as the nose 12 contiguous to it and the first sealing surface 13, are plastically deformed such that the contact between the first sealing surfaces 13 and 23 becomes unstable. At the same time, the second shoulder surface 18, as well as the first unthreaded extension 15a contiguous to it and the second sealing surface 16 are plastically deformed such that the contact between the second sealing surfaces 16 and 26 becomes unstable. As a result, the contact pressure between the first sealing surfaces 13 and 23 and the contact pressure between the second sealing surfaces 16 and 26 may decrease. In view of this, it is preferable that the ratio of the total shoulder area to the steel-pipe body $A_2/A_0$ is relatively large.

No upper limit for the area ratio of the total shoulder area to the steel-pipe body $A_2/A_0$ is specified. However, if $A_2/A_0$ is too large, this effectively means that the areas of the first and second shoulder surfaces 11 and 18 are too large, which means that the outer diameters of the first and second shoulder surfaces 11 and 18 of the pin 10 are too large. As a result, the inner diameters of the portions of the box 20 that have the first thread 24 and first sealing surface 23 must be too large. To provide a sufficient cross-sectional area of the dangerous section of the box 20, the outer diameter of the box must be large. Further, it is difficult to provide sufficient lengths of engagement of the first and second threaded portions. In view of this, for practical reasons, the area ratio of the total shoulder area to the steel-pipe body $A_2/A_0$ is preferably 60% or lower.

Supposing that, in the pin 10, the total of the projected areas of the first and second shoulder surfaces 11 and 18 on a plane perpendicular to the pipe axis CL is $A_2$ and the projected area of the first shoulder surface 11 on a plane perpendicular to the pipe axis CL is $A_1$, then, the ratio of these areas (hereinafter referred to as "area ratio of the first shoulder surface to the entire shoulder"), $A_1/A_2$, is preferably 35% or higher. More preferably, $A_1/A_2$ is 40% or higher. The reasons for this are as follows: $A_1/A_2$ essentially depends on the area of the first shoulder surface 11 relative to the second shoulder surface 18. If $A_1/A_2$ is low, this means that the area of the first shoulder surface 11 is small such that, when an excessive compression load is applied to the threaded joint, the first shoulder surface 11 cannot resist this compression load. Then, the first shoulder surface 11, as well as the nose 12 contiguous to it and the first sealing surface 13, are plastically deformed such that the contact between the first sealing surfaces 13 and 23 becomes unstable. As a result, the contact pressure between the first sealing surfaces 13 and 23 may decrease. In view of this, it is preferable that the area ratio of the first shoulder surface to the entire shoulder $A_1/A_2$ is relative large.

No upper limit for the area ratio of the first shoulder surface to the entire shoulder $A_1/A_2$ is specified. However, if $A_1/A_2$ is too large, this essentially means that the area of the first shoulder surface 11 is too large relative to the second shoulder surface 18, which means that the wall thickness of the nose 12 contiguous to the first shoulder surface 11 of the pin 10 as well as the thicknesses of the portions of the pin that have the first male thread 14 and first sealing surface 13 are too large. As a result, when an internal pressure is applied to the threaded joint, these portions do not effectively deform so as to increase its diameter, and thus the effect of amplification of the contact pressure between the first sealing surfaces 13 and 23 cannot be obtained. In such cases, the contact pressure between the first sealing surfaces 13 and 23 may decrease. In view of this, for practical reasons, it is preferable that the area ratio of the first shoulder surface to the entire shoulder $A_1/A_2$ is 55% or lower.

As shown in FIG. 8, it is preferable that the minimum outer diameter of the first unthreaded extension 15a of the pin 10 is larger than the diameter of the standard taper surface 19b. The standard taper surface 19b is a taper surface with an outer diameter smaller than that of the extension 19a of the tapering of the thread root surfaces of the second male thread 17 by two times the thread height of the second male thread 17. The reasons for this are as follows: The outer diameter of the first unthreaded extension 15a essentially depends on the wall thickness of the first unthreaded extension 15a. If the outer diameter of the first unthreaded extension 15a is small, this means that the wall thickness of the first unthreaded extension 15a is small, such that, when an external pressure is applied to the threaded joint, the diameter-reduction resistance of the portion having the second sealing surface 16 derived from the stiffness of the first unthreaded extension 15a is insufficient. Then, the contact pressure between the second sealing surfaces 16 and 26 may decrease. In view of this, it is preferable that the outer diameter of the first unthreaded extension 15a is relatively large.

No upper limit for the outer diameter of the first unthreaded extension 15a is specified. However, the outer diameter of the first unthreaded extension 15a must be such that the first unthreaded extension 15a does not interfere with the second sealing surface 26 of the box 20 during fastening.

It is preferable that the length of the first unthreaded extension 15a of the pin 10 as measured along the pipe axis starting at the forward end of the second sealing surface 16 is at least one times the thread pitch of the second male thread 17. If the length of the first unthreaded extension 15a is small, when an external pressure is applied to the threaded joint, the contact pressure between the second sealing surfaces 16 and 26 may decrease for the same reasons as in implementations where the wall thickness of the first unthreaded extension 15a is small.

No upper limit for the length of the first unthreaded extension 15a is specified. However, if the length of the first unthreaded extension 15a is excessively large, this means that the total length of the joint is long, which increases the process time or material costs, increasing manufacturing costs. Further, if the length of the first unthreaded extension 15a is larger than a certain level, near-saturation is reached with respect to the improvement of sealing performance. Thus, for practical reasons, it is preferable that the length of the first unthreaded extension 15a is not larger than five times the thread pitch of the second male thread 17.

It is preferable that the length of the second unthreaded extension 15b of the pin 10 as measured along the pipe axis starting at the rearward end of the second sealing surface 16 is at least one times the thread pitch of the second male thread 17. If the length of the second unthreaded extension 15b is small, the actual interference between the second sealing surfaces 16 and 26 derived from the interference fit of the second thread assembly may decrease, which may decrease the contact pressure between the second sealing surfaces 16 and 26.

No upper limit for the length of the second unthreaded extension 15b is specified. However, if the length of the second unthreaded extension 15b is excessively large, this means that the total length of the joint is long, which increases the process time or material costs, increasing manufacturing costs. Further, if the length of the second unthreaded extension 15b is larger than a certain level, near-saturation is reached with respect to the improvement of sealing performance. Thus, for practical reasons, it is preferable that the length of the second unthreaded extension 15b is not larger than five times the thread pitch of the second male thread 17.

It is preferable that the length of the nose 12 of the pin 10 as measured along the pipe axis CL is not smaller than 5 mm. The reasons for this are as follows: If the length of the nose 12 is small, when an excessive tensile load is applied to the threaded joint, the elastic recovery of the first sealing surface 13 produced by the nose 12 is insufficient. Then, the contact pressure between the first sealing surfaces 13 and 23 may decrease. Thus, it is preferable that the length of the nose 12 is relatively large.

No upper limit for the length of the nose 12 is specified. However, if the length of the nose 12 is excessively large, this means that the total length of the joint is large, which increases the process time or material costs, increasing manufacturing costs. Further, if the length of the nose 12 is larger than a certain level, near-saturation is reached with respect to the improvement of sealing performance. Thus, for practical reasons, it is preferable that the length of the nose 12 is not larger than five times the thread pitch of the first male thread 14.

Otherwise, the present disclosure is not limited to the above embodiments, and various modifications are possible without departing from the spirit of the present disclosure. For example, when an internal pressure is applied to the threaded joint, a means may be added to mitigate the close contact by fitting together between the first threads located toward the interior only in the area in the vicinity of the first seal portion. Thus, the portion of the pin 10 that has the first sealing surface 13 located toward the interior can deform to increase its diameter more effectively, thereby amplifying the contact pressure between the first sealing surfaces 13 and 23. The means may be an incomplete thread portion in the first male and female threads 14 and 24 disposed in the area of the first threads in the vicinity of the first seal portion, the incomplete thread portion having an incomplete thread shape. In one implementation of this construction, the incomplete thread portion has thread heights smaller than the normal thread height, where the thread crest surfaces of the first female thread 24 of the box 20 is a cylindrical surface parallel to the pipe axis CL. Thus, a gap is provided between the thread crest surfaces of the first female thread 24 and the thread root surfaces of the first male thread 14 only in the region with the incomplete thread portion. In this implementation, the length of the incomplete thread portion is three to nine times the thread pitch of the first female thread 24 (about 15 to 45 mm).

The arrangement of the threaded joint of the above-described embodiment may be applied to an integral-type or coupling-type thread.

EXAMPLES

A numerical simulation analysis using the elastic-plastic finite element method was conducted to determine the effects of the threaded joint for steel pipe according to the present disclosure.

<Test Conditions>

For a plurality of samples with different intermediate shoulder interferences $\delta_{shld}$, a finite element analysis was conducted to compare their performances. Each sample was a coupling-type threaded joint having the basic structure shown in FIGS. 6 to 8. The common test conditions are provided below.

(1) Dimensions of Steel Pipe

7⅝ [inch]×1.06 [inch] (with an outer diameter of 193.68 [mm] and a wall thickness of 27.0 [mm]), or 8⅝ [inch]×1.15 [inch] (with an outer diameter of 219.1 [mm] and a wall thickness of 29.2 [mm]).

(2) Grade of Steel Pipe

P110 in accordance with the API standards (i.e. a carbon steel with a nominal yield stress of 110 [ksi]).

(3) Dimensions of Thread (Common to all Threads)

Thread pitch: 5.08 [mm], flank angle of load flank: −3°, flank angle of stab flank: 10°, gap at stab flank: 0.15 [mm].

In the finite element analysis, the various samples were modeled where the material was an elastic-plastic material with isotropic hardening, the elastic modulus was 210 [GPa], yield stress was 0.2% and yield strength was 110 [ksi] (=758.3 [MPa]).

<Evaluation Method>

[First Analysis]

The first analysis analyzed the tightening of the threads of each sample. In the first analysis, after the shoulder surfaces of one pair came into contact, tightening was performed until the shoulder surfaces of the other pair came into contact. However, if, after the shoulder surfaces of one pair came into contact, the shoulder surfaces of the other pair did not come into contact even after 15/100 turns of tightening, tightening was stopped at this point.

In the first analysis, the difference between the time point at which the interior shoulder surfaces (11, 21) came into contact and the time point at which the intermediate shoulder surfaces (18, 28) came into contact was evaluated using the following four levels:

excellent; the intermediate shoulder surfaces came into contact and then the interior shoulder surfaces came into contact, where the absolute value of the difference Δ between the numbers of tightening rotations was not greater than 3 [×1/100 turns];

good; the interior shoulder surfaces came into contact and then the intermediate shoulder surfaces came into contact, where the absolute value of the difference Δ between the numbers of tightening rotations was not greater than 3 [×1/100 turns];

acceptable; the interior shoulder surfaces came into contact first, where the absolute value of the difference Δ between the numbers of tightening rotations was greater than 3 [×1/100 turns]; and poor; the intermediate shoulder surfaces came into contact first, where the absolute value of the difference Δ between the numbers of tightening rotations was greater than 3 [×1/100 turns].

[Second Analysis]

In the second analysis, for each sample, a load history modeling the series A test of ISO13679 was applied to the model upon fastening. In the second analysis, after either the interior shoulder surfaces or the intermediate shoulder surfaces came into contact, 3/100 turns of tightening were done, and this point was treated as the completion of fastening.

The second analysis evaluated the sealing performances against external and internal pressures. The sealing performances against the external and internal pressures were evaluated by comparing the contact force per unit circumferential length of the first seal portion (13, 23) in the internal pressure cycle of the load history (i.e. first and second quadrants) and the contact force per unit circumferential length of the second seal portion (16, 26) in the external pressure cycle (i.e. third and fourth quadrants) of the load history. Larger contact forces mean better sealing performances. The sealing performance was evaluated using the following four levels using relative values, where the contact force of a sample with an intermediate shoulder interference $\delta_{shld}=0$ is 1.

excellent; the contact forces of both the first and second seal portions were not smaller than 0.9;
good; the contact forces of both the first and second seal portions were not smaller than 0.8 and the contact force of at least one portion was smaller than 0.9;
acceptable; the contact forces of both the first and second seal portions were not smaller than 0.7 and the contact force of at least one portion was smaller than 0.8; and
poor; the contact force of one of the first and second seal portions was smaller than 0.7.

Table 1 shows an overview of the test conditions and evaluations for the samples.

different dimensions, resulting in different pin elongations $\lambda$; however, as a result of providing the values in 2 significant figures, the lower and upper limits of $\delta_{shld}$ are equal.

For sample Nos. 1, 2, 7 to 9 and 16, $\delta_{shld}$ was lower than the lower limit or higher than the upper limit, which means that Equation (2) was not met. On the other hand, for sample Nos. 3 to 6 and 10 to 15, $\delta_{shld}$ was not lower than the lower limit and not higher than the upper limit, and thus Equation (2) was met.

<Test Results>
[First Analysis]

For sample Nos. 3 to 5 and 10 to 13, the interior shoulder surfaces came into contact first, which means no gap between the tip of the pin and the box. Further, since $\delta_{shld}$ was not lower than the lower limit and not higher than the upper limit, the absolute value of the difference $\Delta$ between the numbers of tightening rotations was relatively small. That is, the number of tightening rotations registered between the time point at which the interior shoulder surfaces came into contact and the time point at which the intermediate shoulder surfaces came into contact was small, preventing plastic deformation of the interior shoulder surfaces.

TABLE 1

| No. | Outer diameter of steel pipe [mm] | $\lambda$ [mm] | Range of $\delta_{shld}$ Lower limit [mm] | Range of $\delta_{shld}$ Upper limit [mm] | $\delta_{shld}$ [mm] | First analysis $\Delta$ [×1/100 turn] | First analysis Contact (first) | First analysis Contact (second) | First analysis Evaluation | Second analysis Internal pressure cycle (first seal) | Second analysis External pressure cycle (second seal) | Evaluation | Remarks |
|---|---|---|---|---|---|---|---|---|---|---|---|---|---|
| 1 | 193.68 | 0.072 | −0.39 | 0.22 | −1.00 | * | interior shoulder | − | acceptable | 0.90 | 0.66 | poor | Comp. ex. |
| 2 | | | | | −0.50 | −11.9 | interior shoulder | intermediate shoulder | acceptable | 0.90 | 0.66 | poor | Comp. ex. |
| 3 | | | | | −0.30 | −8.0 | interior shoulder | intermediate shoulder | acceptable | 0.95 | 0.88 | good | Inv. ex. |
| 4 | | | | | −0.15 | −5.0 | interior shoulder | intermediate shoulder | acceptable | 0.98 | 1.02 | excellent | Inv. ex. |
| 5 | | | | | 0.00 | −1.9 | interior shoulder | intermediate shoulder | good | 1.00 | 1.00 | excellent | Inv. ex. |
| 6 | | | | | 0.15 | 1.2 | intermediate shoulder | interior shoulder | excellent | 1.02 | 0.88 | good | Inv. ex. |
| 7 | | | | | 0.30 | 4.4 | intermediate shoulder | interior shoulder | poor | 1.05 | 0.56 | poor | Comp. ex. |
| 8 | 219.08 | 0.063 | −0.39 | 0.22 | −1.00 | * | interior shoulder | − | acceptable | 0.91 | 0.69 | poor | Comp. ex. |
| 9 | | | | | −0.50 | −12.1 | interior shoulder | intermediate shoulder | acceptable | 0.91 | 0.69 | poor | Comp. ex. |
| 10 | | | | | −0.30 | −8.1 | interior shoulder | intermediate shoulder | acceptable | 0.96 | 0.89 | good | Inv. ex. |
| 11 | | | | | −0.15 | −5.1 | interior shoulder | intermediate shoulder | acceptable | 0.98 | 1.02 | excellent | Inv. ex. |
| 12 | | | | | 0.00 | −2.0 | interior shoulder | intermediate shoulder | good | 1.00 | 1.00 | excellent | Inv. ex. |
| 13 | | | | | 0.08 | −0.5 | interior shoulder | intermediate shoulder | good | 1.00 | 0.98 | excellent | Inv. ex. |
| 14 | | | | | 0.15 | 1.3 | intermediate shoulder | interior shoulder | excellent | 1.01 | 0.88 | good | Inv. ex. |
| 15 | | | | | 0.20 | 2.5 | intermediate shoulder | interior shoulder | excellent | 1.01 | 0.80 | acceptable | Inv. ex. |
| 16 | | | | | 0.30 | 4.5 | intermediate shoulder | interior shoulder | poor | 1.01 | 0.55 | poor | Comp. ex. |

*After the interior shoulder surfaces came into contact, further tightening with 15/100 turns was done, and still the intermediate shoulder surfaces were not in contact.

Table 1 shows the values of intermediate shoulder interference $\delta_{shld}$ calculated for the samples based on Equation (1) provided above. Further, Table 1 shows the values of the elongation $\lambda$ of the pin, lower limit for $\delta_{shld}$ ($=P \cdot \Delta_{min}+\lambda$) and upper limit for $\delta_{shld}$ ($=P \cdot \Delta_{max}+\lambda$) calculated based on Equations (2) to (5) provided above. The set of sample Nos. 1 to 7 and the set of sample Nos. 8 to 18 are from steel pipes of Particularly, for sample Nos. 5, 12 and 13, the absolute value of $\Delta$ was not greater than 3/100 turns. Thus, in a normal tightening process in which, after shouldering, the point of about 3/100 turns of tightening is treated as completion, both the interior shoulder surfaces and the intermediate shoulder surfaces came into contact, ensuring high compression resistance.

For sample Nos. 1, 2, 8 and 9, too, the interior shoulder surfaces came into contact first, meaning no gap between the tip of the pin and the box. However, for sample Nos. 1, 2, 8 and 9, $\delta_{shld}$ was lower than the lower limit and the absolute value of Δ was larger than those for sample Nos. 3 to 5 and 10 to 13. Thus, the number of tightening rotations registered between the time point at which the interior shoulder surfaces came into contact and the time point at which the intermediate shoulder surfaces came into contact was large, causing an excessive plastic deformation of the interior shoulder surfaces.

For sample Nos. 6, 14 and 15, the intermediate shoulder surfaces came into contact first. However, for sample Nos. 6, 14 and 15, $\delta_{shld}$ was not lower than the lower limit and not higher than the upper limit, and thus, after the intermediate shoulder surfaces came into contact, the interior shoulder surfaces came into contact with a small number of tightening rotations. Thus, plastic deformation of the intermediate shoulder surfaces is unlikely to develop in such joints.

For sample Nos. 6, 14 and 15, the absolute value of Δ was not greater than 3/100 turns. Thus, in a normal fastening process, such joints ensure that both the interior shoulder surfaces and the intermediate shoulder surfaces come into contact, providing high compression resistance. Further, such joints are particularly preferable in order to prevent plastic deformation since the intermediate shoulder surfaces, which have larger areas, come into contact first.

For sample Nos. 7 and 16, too, the intermediate shoulder surfaces came into contact first. However, for sample Nos. 7 and 16, $\delta_{shld}$ was higher than the upper limit and the absolute value of Δ was greater than those of sample Nos. 6, 14 and 15. Thus, the number of tightening rotations between the time point at which the intermediate shoulder surfaces came into contact and the time point at which the interior shoulder surfaces came into contact was large, causing an excessive plastic deformation of the intermediate shoulder surfaces.

For sample Nos. 7 and 16, the absolute value of Δ was larger than 3/100 turns. Thus, a normal fastening process cannot cause the interior shoulder surfaces of such joints to contact each other, creating a gap between the tip of the pin and the box. Thus, crevice corrosion is likely to develop.

[Second Analysis]

For sample Nos. 5, 6 and 12 to 15, $\delta_{shld}$ was not lower than the lower limit and not higher than the upper limit, and the absolute value of Δ was not greater than 3/100 turns. Thus, after the shoulder surfaces of one pair came into contact, both the interior shoulder surfaces and the intermediate shoulder surfaces came into contact. Sample Nos. 5, 6 and 12 to 15 had good sealing performance against both external and internal pressures.

For sample Nos. 3, 4, 10 and 11, the interior shoulder surfaces came into contact first. For sample Nos. 3, 4, 10 and 11, the absolute value of Δ was larger than 3/100 turns, and thus the intermediate shoulder surfaces did not come into contact. However, for sample Nos. 3, 4, 10 and 11, $\delta_{shld}$ was not lower than the lower limit and not greater than the upper limit, meaning good sealing performance against both external and internal pressures.

For sample Nos. 1, 2, 8 and 9, $\delta_{shld}$ was lower than the lower limit. For sample Nos. 7 and 16, $\delta_{shld}$ was higher than the upper limit. Thus, sample Nos. 1, 2, 7 to 9 and 16 had significantly decreased sealing performance particularly against an external pressure.

The results of the first and second analyses show that setting $\delta_{shld}$ to such a value that Equations (2) and (3) are met will ensure that the interior shoulder surfaces contact each other, preventing crevice corrosion, and at the same time providing good sealing performance. Further, setting $\delta_{shld}$ to such a value that Equations (2) and (3) are met will prevent excessive plastic deformation of the shoulder surfaces.

The invention claimed is:

1. A threaded joint for steel pipe including a tubular pin and a tubular box, wherein the pin and the box are fastened together as the pin is screwed into the box,
   wherein the pin includes, in order from its tip, a first shoulder surface, a first sealing surface, a first male thread constituted by a taper thread, a second shoulder surface, a second sealing surface and a second male thread constituted by a taper thread,
   the box includes a first shoulder surface, a first sealing surface, a first female thread constituted by a taper thread, a second shoulder surface, a second sealing surface and a second female thread constituted by a taper thread corresponding to the first shoulder surface, first sealing surface, first male thread, second shoulder surface, second sealing surface and second male thread of the pin,
   the pin includes a nose located between the first shoulder surface and the first sealing surface and contiguous to the first sealing surface, and further includes an unthreaded extension located between the second shoulder surface and the second sealing surface and contiguous to the second sealing surface,
   the box includes a recess corresponding to the nose of the pin, and further includes an unthreaded extension corresponding to the unthreaded extension of the pin,
   upon fastening, the first shoulder surfaces come into contact, the first sealing surfaces come into contact, the second sealing surfaces come into contact, a gap is formed between the nose of the pin and the recess of the box, a gap is formed between the unthreaded extension of the pin and the unthreaded extension of the box, the first male thread and the first female thread engage each other, and the second male thread and the second female thread engage each other,
   wherein the distance, as measured in a pipe-axis direction, between the first and second shoulder surfaces of the pin before fastening is represented as $L_{pin}$, the distance, as measured in the pipe-axis direction, between the first and second shoulder surfaces of the box before fastening is represented as $L_{box}$, and the interference $\delta_{shld}$ between the second shoulder surface of the pin and the second shoulder surface of the box is defined by Equation (1) given below, then, Equations (2) and (3) given below are satisfied:

[Formula 1]

$$\delta_{shld} = L_{box} - L_{pin} \quad (1)$$

$$P \times \Delta_{min} + \lambda \leq \delta_{shld} \leq P \times \Delta_{max} + \lambda \quad (2)$$

$$\Delta_{min} = -9/100, \Delta_{max} = 3/100 \quad (3)$$

where P is the thread pitch of the first male thread, $\Delta_{min}$ is the lower limit of the number of tightening rotations after the first shoulder surfaces come into contact or the second shoulder surfaces come into contact during fastening, $\Delta_{max}$ is the upper limit of the number of tightening rotations, and λ is the elongation of the portion of the pin located closer to the tip than the second shoulder surface is during fastening, and, wherein the inner diameter of the pin is represented as ID, the innermost diameter of the second shoulder surface of the pin is represented as $D_{ms}$, the outermost diameter of the first shoulder surface of the pin is represented as $D_{is}$, and the interference between the first male and female threads is represented as $\delta_{th}$, then, $\lambda$ is represented by Equations (4) and (5) given below:

[Formula 2]

$$D_{int} = (D_{ms} + D_{is})/2 \tag{4}$$

$$\lambda = \left\{ \frac{(D_{int} + ID)}{(D_{int} + ID - 2\delta_{th})} - 1 \right\} L_{pin} \tag{5}$$

\* \* \* \* \*